June 5, 1934.  W. N. GLAB  1,961,758
PRESSURE RELIEF VALVE
Filed June 10, 1931  2 Sheets-Sheet 1
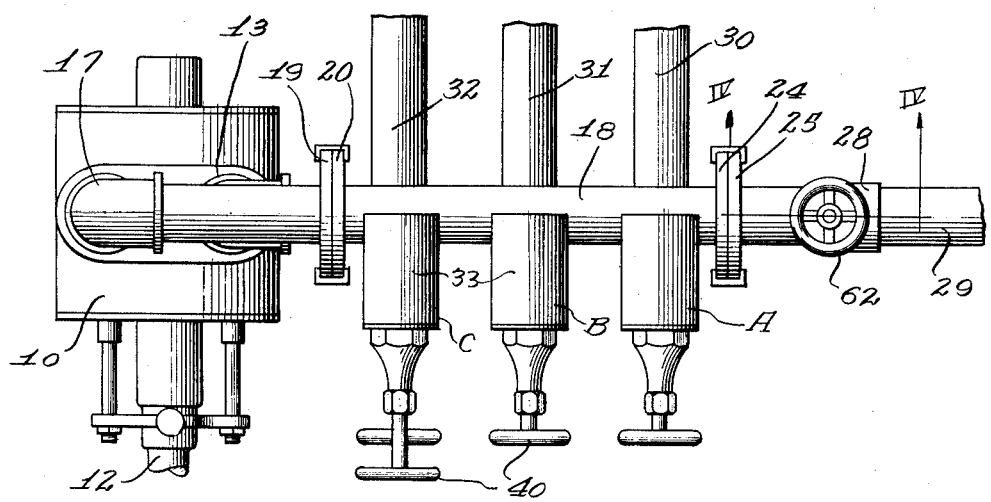
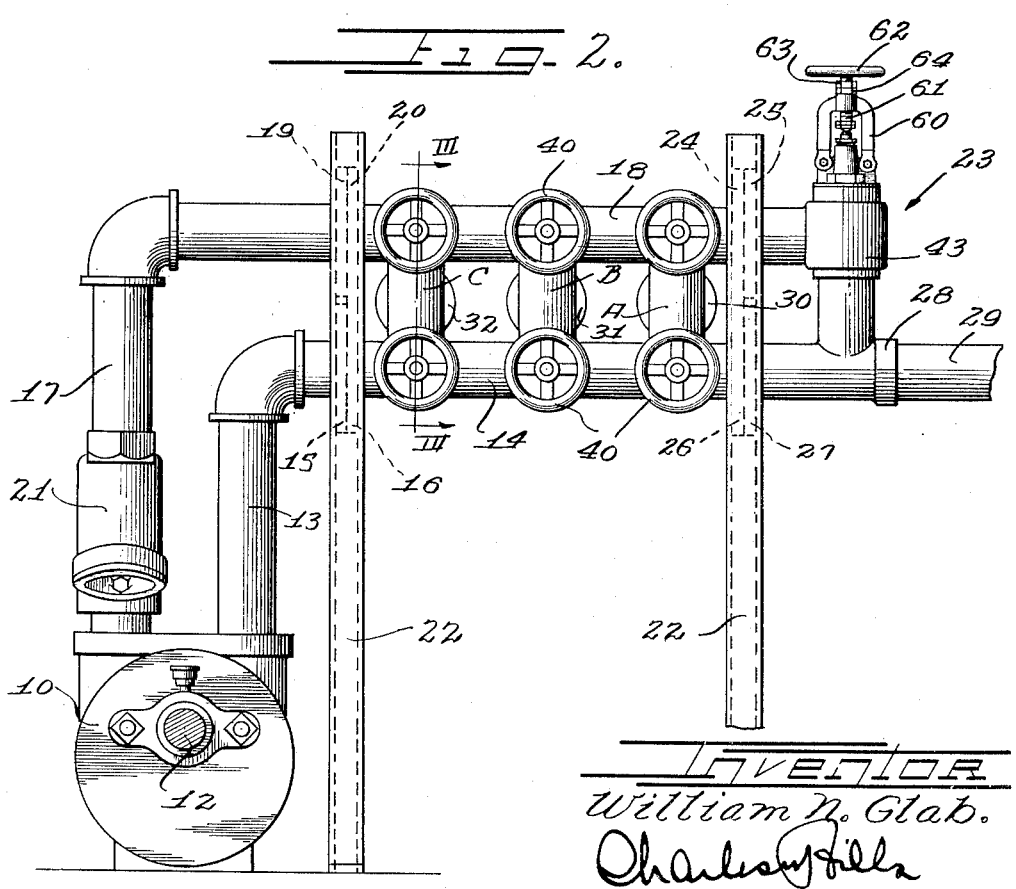
Inventor
William N. Glab.

June 5, 1934.  W. N. GLAB  1,961,758
PRESSURE RELIEF VALVE
Filed June 10, 1931  2 Sheets-Sheet 2

Inventor
William N. Glab.
by Charles Hill
Attys.

Patented June 5, 1934

1,961,758

UNITED STATES PATENT OFFICE 1,961,758

PRESSURE RELIEF VALVE

William N. Glab, Dubuque, Iowa, assignor to Morrison Bros., Dubuque, Iowa, a corporation of Iowa Application June 10, 1931, Serial No. 543,309

1 Claim. (Cl. 137—53)

This invention relates in general to a pressure relief valve, and is particularly concerned with improved means whereby the valve may be quickly and easily adjusted to vary its operating characteristics.

The present invention, while susceptible of many and varied uses, as will be evident to one skilled in the art, is particularly advantageous when used in connection with a liquid receiving and distribution system having a concentrated control such as described in my co-pending application Serial No. 511,150, filed January 26, 1931. Broadly, the system described therein comprises a parallel arrangement of selector valves which are operable in such a manner as to enable the pumping of fluid from a source of supply, such as a tank car or the like, into anyone of a plurality of storage or receiving tanks; or from the tank car or one of the storage tanks to a truck tank loading rack; or if desired, the fluid may be pumped from one storage tank into another.

In such a system, it has heretofore been the practice to provide a relief valve common to the selector valves for controlling the distribution of the fluid being pumped. This relief valve was arranged in such a manner as to be adjustable for operation at different pressures, depending upon the manner in which the system was being operated. For example, when a tank car was being unloaded, it was necessary to pump under a higher head than in the case where fluid was being pumped from one of the storage tanks into a truck tank. Moreover, if the relief valve was set to operate at the higher head, it would not operate properly on the lower head unless its setting was adjusted for the lower head. Thus, it will be evident that each time the pumping conditions were changed from high to low head, and vice versa, the attendant necessarily had to change the setting of the relief valve. Heretofore, in valves of this type, the adjustment of the valve setting was accomplished by means of a wrench adjustable set screw. This arrangement proved objectionable in that often times a suitable wrench was not conveniently at hand and the attendant would not bother to change the setting of the valve, the result being that the system would not be properly protected. Further, the adjustment was more or less a matter of guesswork, the usual procedure being for the attendant to turn the set screw a certain number of turns in the proper direction when changing from high to low head or a certain number of turns in the reverse direction when changing from low to high head. As a consequence of the human element attending the setting of the valve, this arrangement proved to be impracticable.

In order to overcome the foregoing and other objections, the present invention contemplates a relief valve in which the adjustment from high to low head and vice versa may be accomplished quickly and easily, without the necessity of having to use a wrench or other tool, and in which the means for adjusting the valve are so designed that the valves may be accurately set at the high or low head setting, as desired, it being unnecessary to rely upon the judgment of the attendant making the adjustment, thereby eliminating the element of error and the possibility of an improper setting of the valve.

It is also an object of this invention to provide improved valve controlling means which are so designed that the portion of the valve stem which extends through the valve packing is reciprocably moved in response to a rotatable movement of a threaded portion of the valve stem.

In accordance with the general features of this invention, it is proposed to provide a valve member which is normally held in closed position by virtue of a compression spring having one end bearing against a member which is reciprocably mounted in the valve casing. This spring is effective to force the member outwardly of the casing and in order to limit the outward movement of the member, I have provided a hand wheel actuated screw member which abuts the outer end of the reciprocable member. This screw member is provided with a pair of interlocked nuts on each side of the support for the screw member, which may be adjusted so as to limit the axial movement of the screw member. With this arrangement the valve may be quickly and easily set for high pressure by turning the screw member down until one set of nuts engages the screw support, and for a predetermined low pressure by turning the screw member upwardly until the other set of nuts engages the screw support.

As a further feature of this invention, it is proposed to provide a ball and socket engagement between the abutting ends of the reciprocable member and the screw member. This arrangement serves as an anti-friction connection and enables easy operation of the screw member.

Other objects and features of this invention will more fully appear from the following detailed description taken in connection with the accompanying drawings which illustrate a single embodiment thereof, and in which Figure 1 is a plan view illustrating a concentrated control for a fluid receiving and distribution system, a relief valve embodying the features of my invention being applied thereto;

Figure 2 is a front elevation of the system illustrated in Figure 1;

As shown on the drawings:

Figure 3:
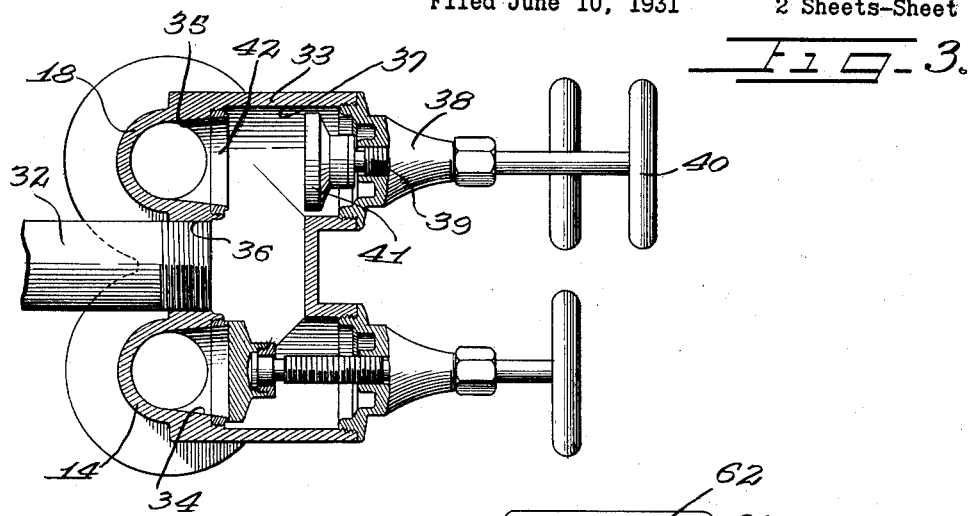
Figure 3 is an enlarged transverse sectional view through one of the valve units forming a part of the system illustrated in Figure 1, taken substantially on line III—III of Figure 2.

In order that the features of my invention may be more clearly understood, there is illustrated in Figure 1 a concentrated control for a fluid receiving and distribution system, which embraces a relief valve embodying the features of my invention. This system comprises a pump mechanism 10 having a driving shaft 12 which is adapted for connection to an electric motor or other suitable source of power. The discharge side of this pump is connected through a pipe 13 to one end of a horizontally disposed header 14 by means of cooperative flanges 15 and 16. The intake side of the pump is connected by a pipe 17 to one end of a horizontally disposed header 18 by means of cooperative flanges 19 and 20. Connected in the pipe 17, there is a filtering device 21 which is so arranged that oil entering the pump will have to pass therethrough.

The headers 14 and 18 are supported in parallel spaced relationship on suitable supports 22. At the ends of the headers 14 and 18, which are opposite the ends to which the pump is connected, the headers are connected through a relief valve generally indicated at 23. One side of this valve is connected to the header 18 by cooperative flanges 24 and 25, and the other side is connected to the header 14 by means of cooperative flanges 26 and 27. This latter connection forms an extension to the header 14 and is arranged with an outlet connection 28 which is arranged for connection to a pipe 29 leading to a loading rack or platform for use in delivering oil or other liquids into truck tanks or the like.

Disposed in spaced relationship between the pump and relief valve 23 are a plurality of selector valve units A, B, and C which interconnect the headers 14 and 18, these valve units being respectively connected to pipe lines 30, 31 and 32. The pipe line 30 connects the valve unit A with a liquid storage tank or container mounted in a remote position; the pipe line 31 connecting the valve unit B with a remotely positioned oil-receiving tank or container; and the pipe line 32 connecting the valve unit C with a remotely located tank car from which liquid such as oil may be received.

All of the valve units are similarly constructed and each comprises a U-shaped casing 33 which is integrally formed with the headers 14 and 18 and in communication therewith through openings 34 and 35 respectively. The casing 33 is provided at its middle portion between the headers 14 and 18 with an internally threaded opening 36 for receiving one of the pipe lines 30, 31, or 32, as the case may be.

In axial alignment with each of the openings 34 and 35, the casing is formed into a valve chamber 37 at the outer end of which a cap 38 is threadedly secured to the casing. This cap is passaged and threaded to receive a threaded valve stem 39 having a valve handle or wheel 40 secured thereto and by means of which the valve may be actuated. The inner end of the valve stem 39 is connected to and carries a valve member 41 which is adapted for seating on a seating member 42 to close the opening 35 to the headers 14 or 18 as the case may be.

Figure 4:
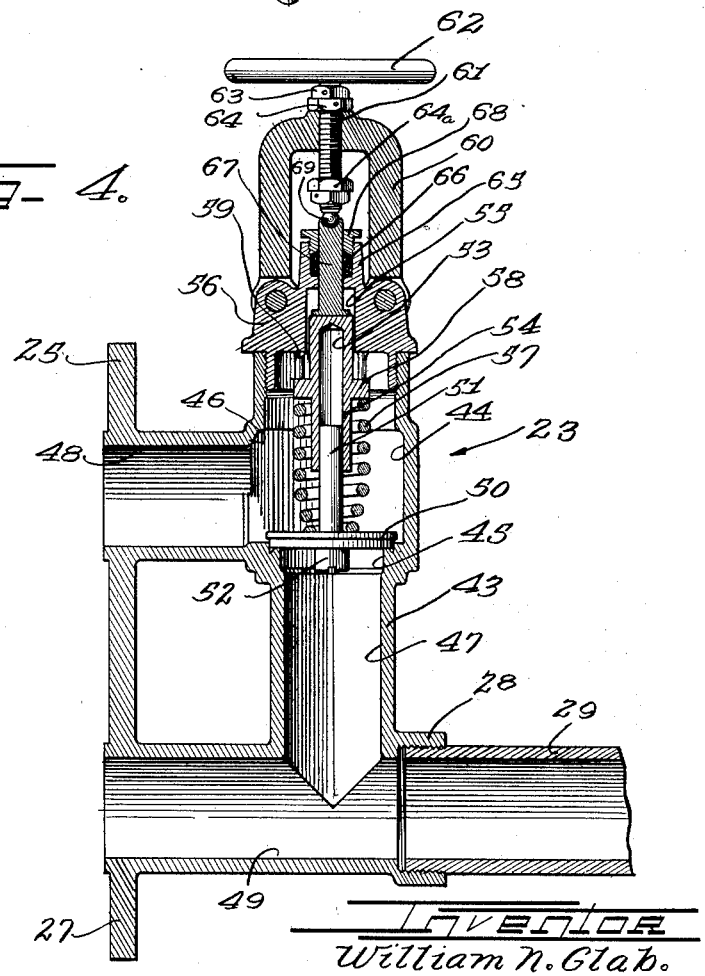
Figure 4 is an enlarged elevational section through the relief valve of my invention to show the operative relationship and details of its component parts, taken substantially on line IV—IV of Figure 1.

The relief valve 23, as shown in Figure 4, comprises a main casing 43 which defines a main valve chamber 44 having openings 45 and 46 at right angles, which communicate with passageways 47 and 48 respectively. The passageway 48 terminates in the flange member 25 and the passageway 47 extends into a transversely disposed passageway 49 having one end terminating in the flange 27 and the other end terminating in the outlet connection 28.

At the junction of the opening 45 with the main valve chamber 44, the casing wall is formed in such a manner as to effect a valve seat for coacting with a valve member 50 to close the opening 45 and thus prevent communication between the main valve chamber and the passage 47. The valve member 50 is secured at one end of a centrally disposed stem 51 by means of a screw 52 which extends through the valve member and threadedly engages the end of the stem. The upper end of the stem 51 extends into a socket 53 formed in a member 54. The upper end of member 54 extends into and is guided by the walls of a socket 55 formed in a cap member 56 which is adapted for threadedly engaging the casing 43. Surrounding the stem 51 and member 54 is a compression spring 57 having its lower end in engagement with the valve member 50 and its upper end engaging a peripheral flange 58 formed on the member 54, so that under the influence of this spring, the valve member is forced downwardly against its seat and the member 54 is forced upwardly, the latter member being guided by inwardly extending and circumferentially spaced ribs 59 which are formed on the cap member.

Secured to the cap member 56 is a yoke 60 which has a screw member 61 threadedly supported therein, the member 61 having secured to its upper end a hand wheel 62 by means of which the screw member may be rotated in order to effect axial movement thereof. The axial movement of the screw member 61 is limited by a pair of nuts 63 and 64 disposed on either side of the mounting for the screw member, the nut 64 serving as a variable adjustment for determining the axial movement of the screw and the nut 63 serving to lock the nut 64 in adjusted position. Each of the nuts 63 and 64 is provided with indicia 64ª, which may be a punch mark or the like, whereby the relative positions of the nuts will be immediately apparent.

This arrangement is particularly efficacious in that it enables the adjustment of the pressure at which the valve will operate with greater precision. For example, if only one nut were used, it would be very difficult to tell whether the adjusting nut had been moved one or more turns; whereas, by providing two nuts with punch marks or other indicia thereon, one nut may be held stationary while the other is moved relative thereto, the relative positions of the marks serving as a guide whereby the number of turns taken on the nut that has been moved are easily observed.

The upper end of the cap member 56 is shaped to form a stuffing box 65 within which there is disposed a packing material 66 which surrounds a reciprocable member 67 that extends through the stuffing box and into the socket 55. This packing is retained in the stuffing box by a threaded bushing 68 which surrounds the member 67. The lower end of member 67 bears against the top end of member 54 and the upper end of the member 67 is disposed so as to be engageable by the lower end of the screw 61. The upper end of member 67 is fitted with a ball 69 which is in surface engagement with a suitably formed socket on the engaged end of the screw 61.

With the arrangement just described, the valve is quickly and easily adjusted for operation at a low head and a high head. To adjust the valve for high head operation, the hand wheel 62 is turned in the proper direction to bring the upper nut 64 against the yoke 60. Actuating the hand wheel in this manner will force members 54 and 67 downwardly to compress the spring 57 so that the valve 50 will be more forcibly held against its valve seat. Movement of the hand wheel 62 in the opposite direction until the lower nut 64 engages the yoke will enable the spring 57 to force members 54 and 67 upwardly, with the result that the valve 50 is held less firmly against its seat and will be actuated at a lower pressure.

Briefly, the operation of the relief valve in connection with the fluid receiving and distribution system described herein will be as follows:

Assuming that it is desired to pump fluid from the tank car, and that all the selector valves are closed, the attendant will open the upper valve member 41 of valve unit C as shown in Figure 3. With this valve member opened, fluid will be drawn from the tank car into header 18 and sent through pipe 17 to the pump from whence it is discharged through pipe 13 into the header 14 from which it may pass undisturbed, if the lower valve members of the units A, B, and C are all closed, to the pipe 29 leading to the truck tank loading rack, or if desired, the fluid discharged from the pump may be distributed in either of the pipes 30 or 31 leading to the storage tank by opening the respective lower valve units A and B.

When pumping from the tank car, as just described, the relief valve 23 should be set for operation at its highest pressure, this adjustment being made by actuating the hand wheel 62 so as to bring the upper nut 64 into engagement with the yoke 60.

If it is desired to pump fluid from one of the storage tanks, the upper valve members 41 of the valve units A or B are opened, depending upon which tank it is desired to pump from. In this case, the pump will draw fluid from the tank and discharge it into the header 14 as before, from whence it may be distributed to the other tank by opening the lower valve member of the valve unit which is connected to the tank into which it is desired to pump; or by maintaining the lower valve members of the valve units A, B, and C closed the fluid may be distributed to the truck tank loading rack through pipe 29 as before.

When pumping from the tank as just described, the relief valve 23 should be set for operation at its lower pressure, which is accomplished by rotating the hand wheel 62 so as to bring the lower nut 64 into engagement with the yoke 60.

From the foregoing, it will be apparent that this invention provides a relief valve which is quickly and easily adjusted for operation at a high or low head, the adjusting means being so designed that an actuating tool is unnecessary; in which adjustment of the valve is not left to judgment of the attendant making the adjustment, thereby eliminating the possibility of an improper adjustment of the valve; and in which a novel valve stem is provided having a rotatable section and a reciprocable section, the reciprocable section extending through the valve packing, whereby the life of the packing is enhanced by virtue of the fact that it is subjected to a reciprocable movement rather than a reciprocable and rotative movement.

Now, it is of course to be understood that although I have described in detail the preferred embodiment of my invention, the invention is not to be thus limited but only insofar as defined by the scope and spirit of the appended claim.

I claim as my invention:

A relief valve comprising a casing, a valve seat formed in said casing, a valve operatively associated with said seat and having a central upwardly extending stem, a cap secured to said casing having a centrally disposed packing gland and an upwardly extending yoke, a member within said casing having a centrally disposed socket for receiving said stem, an expansion spring surrounding said stem having one end bearing against said valve and its other end bearing against said member, a reciprocable member extending thru the packing gland, the lower end thereof abutting said member, a ball supported in the upper end of said reciprocable member, a manually operable screw supported by said yoke in axial alignment with said reciprocable member, the lower end of said screw having a socket for receiving a portion of said ball to form an anti-friction joint, and adjusting nuts disposed on said screw on either side of said yoke, whereby the upward and lower limits of travel of said screw may be independently adjusted.

WILLIAM N. GLAB.